(12) United States Patent
Lykken

(10) Patent No.: US 6,971,466 B1
(45) Date of Patent: Dec. 6, 2005

(54) TORQUE COMPENSATING REAR UNDERCARRIAGE FOR TRACK DRIVEN VEHICLES

(75) Inventor: Tom Lykken, Fargo, ND (US)

(73) Assignee: Sno-Bear Industries, LLC, Harwood, ND (US)

( * ) Notice: Subject to any disclaimer, the term of this patent is extended or adjusted under 35 U.S.C. 154(b) by 95 days.

(21) Appl. No.: 10/769,486

(22) Filed: Jan. 30, 2004

(51) Int. Cl.[7] .................................... B62M 27/02
(52) U.S. Cl. ...................... 180/190; 180/193
(58) Field of Search .............. 180/9.1, 9.2, 9.25, 180/9.28, 9.5, 190–193; 305/120, 127, 128

(56) References Cited

U.S. PATENT DOCUMENTS

| | | | |
|---|---|---|---|
| 3,545,821 A * | 12/1970 | Erickson | 305/127 |
| 3,879,092 A | 4/1975 | Rose | 305/24 |
| 3,933,213 A | 1/1976 | Trowbridge | 180/5 R |
| 4,462,480 A | 7/1984 | Yasui et al. | 180/193 |
| 4,518,056 A | 5/1985 | Kobayashi | 180/193 |
| 5,730,242 A * | 3/1998 | Furusawa | 180/193 |
| 5,860,486 A * | 1/1999 | Boivin et al. | 180/193 |
| 5,904,216 A * | 5/1999 | Furusawa | 180/193 |
| 6,032,752 A * | 3/2000 | Karpik et al. | 180/9.52 |
| 6,283,241 B1 | 9/2001 | Kubota | 180/193 |
| 6,390,219 B1 * | 5/2002 | Vaisanen | 180/193 |
| 6,450,279 B1 * | 9/2002 | Imamura | 180/193 |
| RE38,124 E | 5/2003 | Mallette et al. | 180/193 |
| 6,631,778 B2 | 10/2003 | Mallette | 180/193 |
| 6,802,383 B2 * | 10/2004 | Nishijima | 180/190 |
| 6,823,957 B2 * | 11/2004 | Girouard et al. | 180/190 |
| 2002/0033290 A1 | 3/2002 | Vaisanen | 180/190 |

* cited by examiner

Primary Examiner—Lesley D. Morris
Assistant Examiner—L. Lum
(74) Attorney, Agent, or Firm—Curtis Harr

(57) ABSTRACT

This torque compensating track drive is designed to provide track drive vehicles with an undercarriage that distributes the weight of the vehicle over the greatest possible area and also ensures that as much of the drive track is in contact with the surface as possible in all driving situations.

19 Claims, 8 Drawing Sheets

FIG 9       PRIOR ART
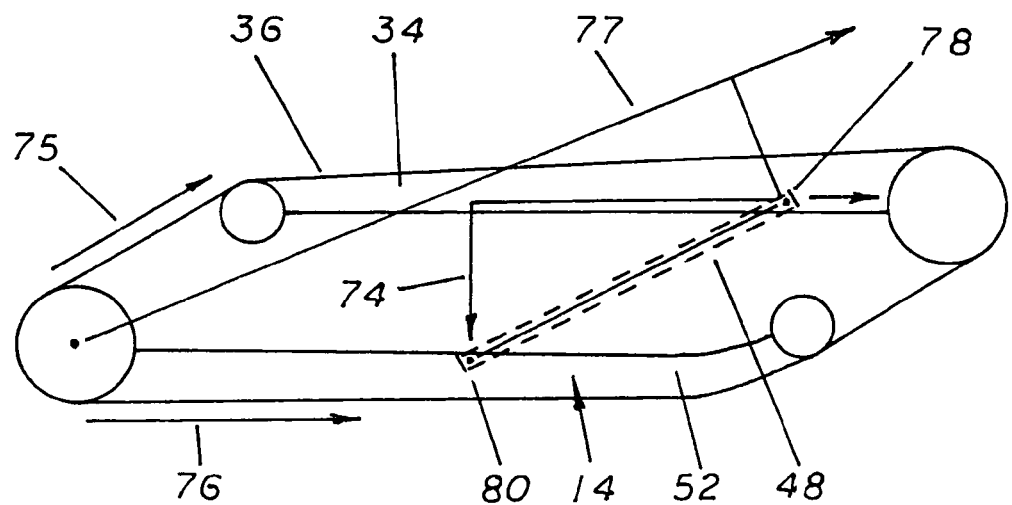
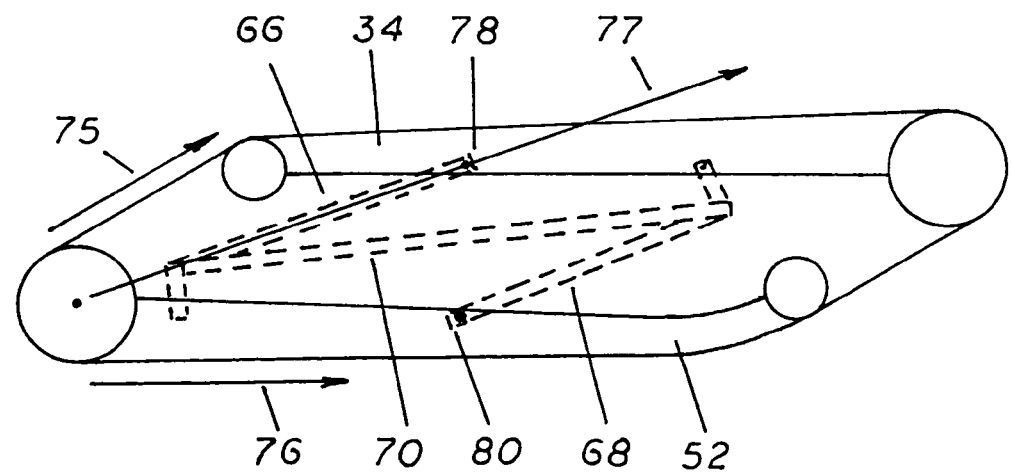
FIG 10

TORQUE COMPENSATING REAR UNDERCARRIAGE FOR TRACK DRIVEN VEHICLES

BACKGROUND OF THE INVENTION

The present invention relates to an improvement in the manner of construction of an undercarriage suspension in track driven vehicles. More specifically, to a manner of constructing the rear undercarriage of such vehicles so that the largest possible amount of the track remains in continuous contact with the surface over which the vehicle is traveling irrespective of the amount of power or torque being applied to the track.

There are many different vehicles today that employ a track drive system to propel them. Of these, the ones specifically designed to incorporate some of the vehicle's suspension components within the undercarriage of the track drive are of interest here. Generally, these type of track drive systems are made up of flexible continuous loop tracks that surround an internal frame. The internal frame is in turn primarily made up of a chassis component (itself fixedly attached to the frame of the relevant vehicle) and slide rail components that are pivotally connected to the chassis component. The area between the chassis and slide rail components is then spanned by the actual suspension units which are typically coil-over shock absorbers or torsion spring system with shock absorbers which serve both to fix the position of the slide rails in relation to the chassis and to allow this relationship to vary in the function of the suspension. Finally, the internal frame also contains a plurality of wheels which drive and guide the track over the chassis and slide rails.

This design of track drive systems works well for the most part and is commonly employed in vehicles that travel predominately over snow covered surfaces such as snowmobiles and general purpose tracked utility vehicles. The pivotal mounting of the slide rails along with the spring and shock absorber system provide for the vertical suspension travel that is necessary for a comfortable and safe ride. Additionally, the pivotal attachment also allows the slide rails to move forwards and rearwards in a horizontal manner over relatively small distances. This horizontal travel is necessary to the operation of the track drive to ensure that the overall circumference of the track remains the same irrespective of the vertical orientation of the slide rails in relation to the chassis.

While the above described flexibility of these track drives is necessary for their proper operation, it also creates a problem that is common to all such systems. The spring and shock absorber system employed must be of a sufficiently light weight (or softness) to allow for the desired travel of the suspension to provide the desire ride characteristics to the vehicle. This soft suspension results in track drive systems that are subject to compressible forces derived from sources other than normal vertical suspension movement which in turn can affect the operation of the track drive system.

The most common source for this compression is from the rotational forces supplied to drive the track to propel the vehicle. The rotation of the track tends to compress the suspension in such a manner so that the rear portion of the track drive system is lifted towards the body of the vehicle and away from the surface upon which it is traveling. This change in track geometry has the effect of placing a significant amount of the down force created by the weight of the vehicle on the most forward section of the track that is associated with the slide rails. In the normal or unpowered configuration, the track contact surface is defined by that portion of the track that is associated with the entire length of the slide rails. Thus, the changes effected upon the drive track alters the manner by which it operates to propel the vehicle.

The unequal weight distribution of the track's contact surface has two related effects on the performance of the track drive. The first of these is that it lessens the amount of overall traction available to the vehicle. This is an undesirable situation as traction is critical to a vehicle that operates in snow not only because of the inherently slippery nature of snow, but also because rotationally driven articles tend to sink into and become stuck in snow. The second problem is that the unequal weight distribution of the track's contact surface also tends to focus the vehicles weight within this relatively small area. This tends to cause the track drive system to sink, thereby decreasing its effectiveness. Thus, the design of track drive systems in use today contains a built in characteristic that decreases the ability of the track to transfer power to the surface of the snow effectively.

Therefore, it can be seen that it would be desirable to provide a means of constructing track drive systems used in vehicles designed to travel over snow, mud, sand, or other similar surface which operates to transfer the vehicle's weight over the greatest possible area by maximizing the track's contact area irrespective of whether the vehicle is stationary, accelerating, or moving at a consistent speed. Additionally, it can be seen that it would be desirable to provide a means of constructing track drive systems that would provide the greatest possible amount of traction to the vehicle under all operating situations.

SUMMARY OF THE INVENTION

It is the primary objective of the present invention to provide a means of constructing track drive systems used in vehicles designed to travel over snow, mud, sand, or other similar surface which operates to transfer the vehicle's weight over the greatest possible area thereby reducing its tendency to sink into these types of surfaces.

It is an additional objective of the present invention to provide such a means of constructing track drive systems that would provide the greatest possible amount of traction to the vehicle under all operating situations.

These objectives are accomplished by the use of a track drive and suspension system which is specifically designed and constructed to provide the largest possible track contact surface which distributes the weight of the vehicle evenly across this surface. The present invention as such is designed to incorporate these benefits into track driven vehicles that are commonly used in snow such as snowmobiles or general purpose tracked utility vehicles. Therefore, the present invention is designed to improve the performance of these vehicles in the environment in which they were intended to be operated.

The present invention resembles all such track drive systems in its general configuration in that it is made up of an internal frame around which travels a flexible continuous loop track. The track is powered by the vehicle's engine which is the mechanism employed to propel the vehicle in the desired direction. Additionally, the internal frame component of the present invention contains the suspension components that are necessary to provide the vehicle with the required ride characteristics that are necessary for its operation. To accomplish this, track drive systems, as well as the present invention, are designed to expand and contract in the vertical plane to provide the required suspension travel.

The internal frame component of the track drive systems generally consists of a horizontally oriented chassis member which provides for their attachment to the vehicle upon which they are being used. The chassis then provides the point of attachment for the remaining components. Most notable of these in terms of the internal frame are the slide rails which form the lower portion of the internal frame and are horizontally oriented in a parallel manner to the chassis. The slide rails are pivotally attached to the chassis which allows travel required to provide the necessary suspension. The travel of the slide rails relative to the chassis is controlled by one or more spring and shock absorber assemblies that are pivotally attached at either end to the chassis and slide rails respectively. Finally, the internal frame also provides the point of attachment for a plurality of wheels which are employed either to power or guide the track during operations.

The present invention differs from previous designs of this type of track drive and suspension systems in the manner by which the pivotal attachment of the slide rails to the chassis is accomplished and the affects this has on the performance of the track drive system. In general terms, the connection of these components is facilitated by the use of a pair (one on each side of the internal frame) of front suspension arms and rear suspension arms which span the distance between the chassis and slide rails and which are pivotally attached thereto on either end by varying means. In fact, it is the means employed in making these pivotal attachments that, to a large degree, controls the relevant characteristics of the present invention's weight distribution.

In the conventional configuration of the construction of a track drive system, the rear suspension arms are attached to the chassis by a simple pivotal means and to the slide rails by a pivotal attachment to a pair links which are in turn pivotally attached to the slide rails. This method of attachment practically isolates the slide rails from the chassis because, to a certain degree defined by the length of the links, both vertical and horizontal movements of the slide rails are taken up by the links and their pivotal attachment to the rear suspension arms. Conversely, the attachment of the front suspension arms to both the chassis and the slide rails is accomplished by the use of simple pivotal attachments at both ends of the front suspension arms. This method of attachment does not isolate the slide rails from the chassis and therefore the movements imputed to the slide rails are transferred to the chassis through the front suspension arms.

For the purposes of this discussion it is the pivotal attachment of the front suspension arms and its operational characteristics that are important. This method of attachment means that horizontal tractive forces of the slide rails are transferred to the chassis through the front suspension arms. The net effect of this circumstance is that a pivot point located forward of the center point of the slide rails is created allowing the slide rails to pivot as a whole relative to the chassis. The tractional forces created by powering the track operates upon this pivotal attachment to alter the geometry of the track drive by lessening the force between the chassis and the slide rails at the rear and increasing it at the front. This alteration of the geometry tends to focus all created down forces on to one relatively small area of the drive track which in turn alters its performance characteristics.

The present invention employs an alternative method of tying the slide rails to the chassis that minimizes the geometry altering characteristics of the prior art. Generally, this is accomplished by not only isolating the attachment of the rear suspension arms to the slide rails, but also isolating the attachment of the front suspension arms to the chassis. Additionally, the front suspension arms are tied to the rear suspension arms at these points of isolation by the use of a pair of drag links. The drag links, in conjunction with the isolated attachments, operates to transfer horizontal tractive forces from the front suspension arms to the rear suspension arms and the then to the chassis.

In the construction of the present invention, the attachment of the front suspension arms to the slide rails is facilitated through a simple pivotal attachment. However, the attachment of the front suspension arms to the chassis is accomplished through the use of additional links which in turn effectively isolates the chassis at this point. Finally, the points of attachment between the rear suspension arms and their associated links and the front suspension arms and their associated links provide the point of pivotal attachment for the drag links. The drag links tie the rear suspension arms to the front suspension arms in a manner that effectively bypasses the isolating links.

The end result of this method of construction is that the horizontal tractive forces in the slide rails are transferred from the simple pivotal attachment of the front suspension arms to the slide rails though the drag links to the simple pivotal attachment of the rear suspension arms to the chassis. This effectively moves the point at which these tractional forces are transferred to the chassis rearward. The significance of this movement is that there is no longer a pivot point in the slide rails. These forces are moved rearward and if properly positioned offset the belt tractive forces. This then means that the belt tractive forces of the moving track no longer alter the weight distribution of the track drive under power. This means that the track's contact surface retains its overall general shape and size throughout all phases of operation of the present invention thereby avoiding the associated difficulties inherent in the design of all previous track drive systems.

For a better understanding of the present invention reference should be made to the drawings and the description in which there are illustrated and described preferred embodiments of the present invention.

DESCRIPTION OF THE DRAWINGS

FIG. 9 is a schematic representation of a typical example of the prior art illustrating the effect the forces generated by the track have on its remaining components.

FIG. 10 is a schematic representation of the present invention illustrating the manner by which it compensates for the forces generated by the track.

DESCRIPTION OF THE PREFERRED EMBODIMENT

Figure 1:
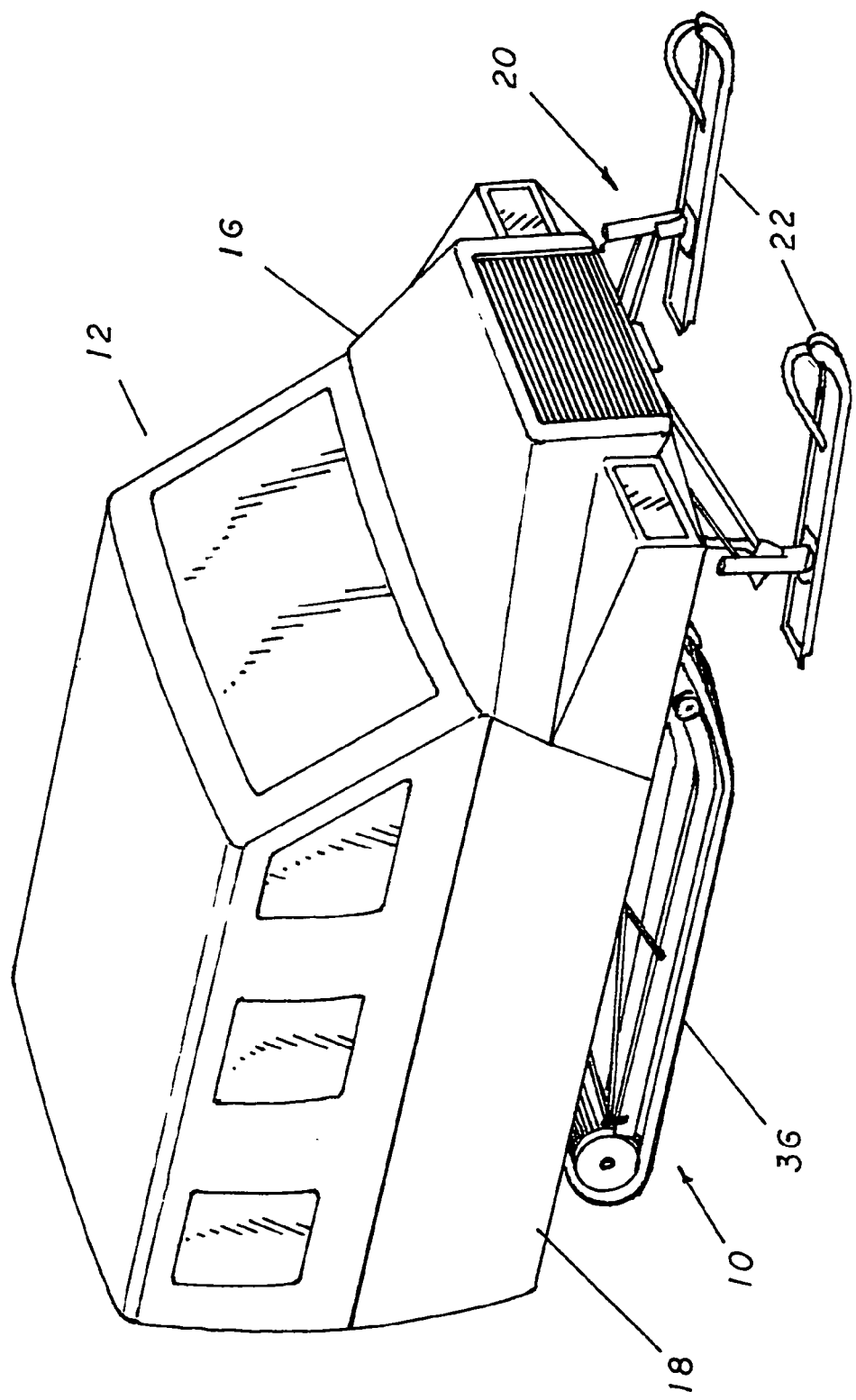
FIG. 1 is a perspective view of a typical general purpose tracked utility vehicle in which the present invention is employed to provide both a method of propulsion and the vehicle's rear suspension.
Figure 2:
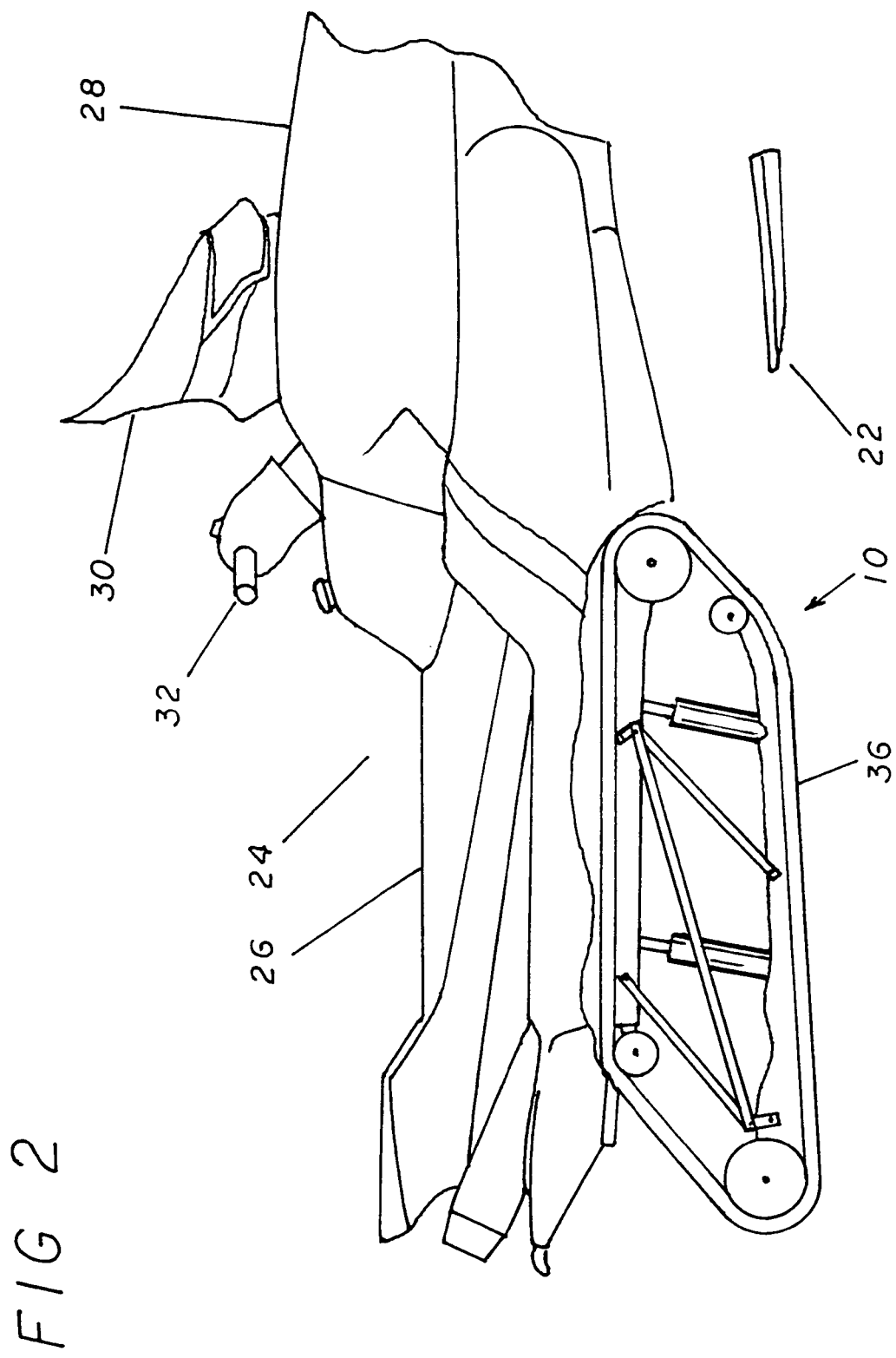
FIG. 2 is a side elevation view of a typical snowmobile illustrated as employing the present invention for the purposes of propulsion and rear suspension.

Referring now to the drawings, and more specifically to FIGS. 1 and 2, the torque compensating track drive system 10 is designed specifically for use with tracked vehicles designed for use in a variety of situation such as snow, sand, mud, or other similar surfaces. However, for the purposes of simplicity it is illustrated here as employed in vehicles used on snow covered ground such as general purpose tracked utility vehicles 12 as illustrated in FIG. 1 and snowmobiles 24 as illustrated in FIG. 2. The general purpose tracked utility vehicle 12 is a description of a wide variety of vehicles generally consisting of a cab 18 employed to carry passengers or equipment. The forward end of the vehicle's cab 18 generally provides for the attachment of the engine compartment 16 which provides for the attachment and containment of the vehicle's power plant but also for its front end 20. The front end 20 contains the vehicle's steering apparatuses, in this case a pair of snow skies 22, and its front suspension components.

The present invention is employed with this type of vehicle to both provide the propelling force that moves it in the desired direction and the needed suspension to the rear portion of these tracked vehicles 12. In these purposes, the present invention is placed in the appropriate orientation beneath the cab 18 and can be used as a single track drive unit or in a configuration using a plurality of individual units to provide the necessary stability and traction to the vehicle. The benefits that the present invention provides when used in conjunction with these types of vehicles have to do with the amount of the track 36 that is in contact with the surface of the snow in differing conditions and the way this affects the distribution of the vehicle's weight on the snow. The mechanisms that facilitate these benefits are derived from the manner of construction of the present invention and will be made more clear as they are explained in greater detail below.

The general configuration of a typical snowmobile 24 is illustrated in FIG. 2. A snowmobile 24 is a vehicle that is most commonly used for recreational purposes and is generally driven over the surface of snow at relatively high speeds. For this purpose it is usually made up of a seat 26 positioned over a tracked drive system (in the instant case, the present invention), which is in turn connected to a power plant contained within body 28 positioned forward of the seat 26. The user controls the snowmobile through the handlebars 32 positioned behind the windscreen 30 and connected to a pair of skis 22 located beneath the forward portion of the snowmobile's 24 body 28. This general configuration is well known and provides a popular vehicle for outdoor use in the wintertime in areas that are commonly covered with snow.

Snowmobiles 24 have long used tracked drive systems to transfer the power developed by their power plants to the surface of the snow and to provide the necessary suspension components to the rear portion of the vehicle. The benefits that the present invention instills to snowmobiles 24 for these purposes have to do with the amount of the traction the track 36 supplies to the snowmobile 24 in differing riding situations such as acceleration and steady cruising and what portion of the track 36 actually engages the snow in these differing situations. Again, the mechanisms that facilitate these benefits are derived from the manner of construction of the present invention and will be made more clear as they are explained in greater detail below.

Figure 3:
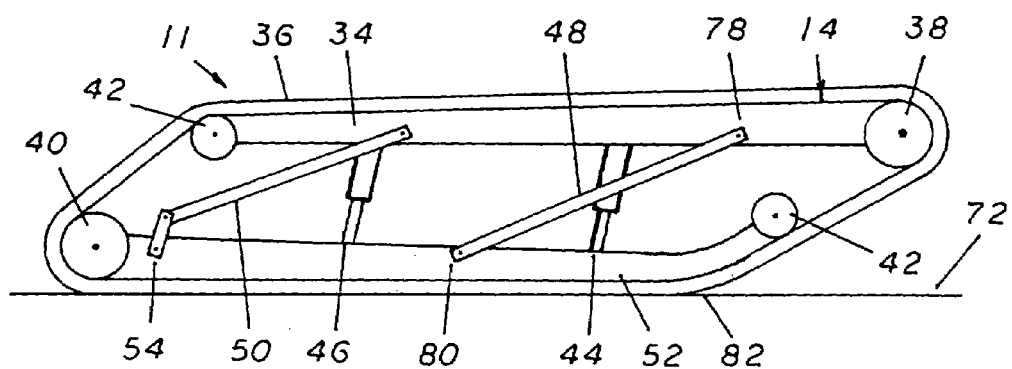
FIG. 3 is a side elevation view of an example of the prior art and illustrates the general configuration of a track drive system and the manner employed to construct the internal frame component.
Figure 4:
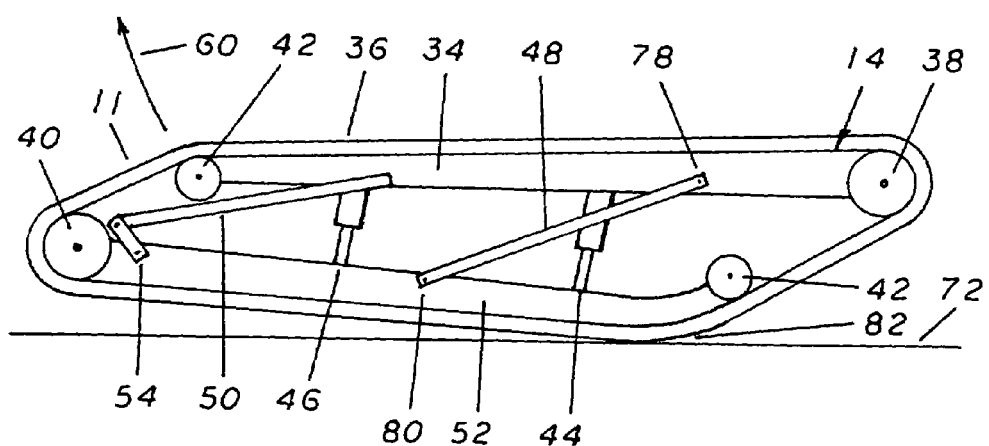
FIG. 4 is a side elevation view of the prior art of FIG. 3 further illustrating the alteration of its geometry when tractional forces are applied to the track.

In order to adequately and accurately describe the manner of construction and operation of the present invention we must first generally discuss the construction and operation of a typical example of the prior art which is illustrated in FIGS. 3 and 4. These FIGURES show a track drive system 11 which has been used for the described purposes in these applications for years. The track drive systems 11 generally are made up of an external continuous loop track 36 that encircles an internal frame 14. While it is the track 36 that actually engages the surface upon which the vehicle is traveling, it is the internal frame 14 that supports and gives shape to the track 36.

The internal frame 14 is made up of a horizontally oriented chassis 34 that is fixedly attached to a vehicle and which is stationary relative to that vehicle. The chassis 34 is the component of the internal frame 14 to which the remaining components are attached either directly or through their attachment to one of the other components. The chassis 34 also defines the upper edge of the track 36 as it facilitates the positioning of attaches guide wheels 42 and the drive wheels 38 over which the track 36 rides during operation.

Another major component of the track drive system 11 are the slide rails 52 which define the lower edge of the track 36 and the length of the track contact surface 82 and also provide the point of attachment for the rear track wheels 40. The slide rails 52 are attached to the chassis 34 in a plurality of locations and by a plurality of mechanisms. The pivotal attachment of the slide rails 52 is critical to the operation of the track drive system 11 as it allows the orientation of the slide rails 52 to vary in relation to the chassis 34 during its operation. This variation in the orientation of these two components equates to the actual height of the track drive system 11. The expansion and contraction of this height provide the suspension component that is necessary for the operation of the vehicle within which the track drive systems 11 are incorporated.

The control of the expansion and contraction of the height of the track drive system 11 is controlled by the use of a commonly used spring and shock absorber system, here illustrated as front and rear shock absorbers, 44 and 46. The front and rear shock absorbers, 44 and 46, are pivotally attached at one end to the chassis 34 and at the other end to the slide rails 52 and operate to maintain the spacial relationship between these two components as stable as possible in all aspects of the track drive system's 11 operation. Additionally, the pivotal attachment of the front and rear shock absorbers, 44 and 46, allows for the horizontal movement of the slide rails 52 in relation to the chassis 34 as well as vertical movement. The horizontal movement of the slide rails 52 is important to the operation of the track drive system 11 as without it, the internal frame 14 would not be capable of maintaining the outer circumference needed for the track 36 to operate properly.

The actual pivotal attachment of the slide rails 52 to the chassis 34 is accomplished through the use of the front suspension arms 48 and the rear suspension arms 50. As the name implies, the front suspension arms 48 span the distance between the chassis 34 and the slide rails 52 toward the forward end of the internal frame 14. The front suspension arms 48 are pivotally attached to the slide rails 52 at the slide rail pivot point 80 located forward of the midpoint of the length of the slide rails 52. The other end of the front suspension arms are in turn pivotally attached to the chassis 34 at the chassis pivot point 78 which is generally located in the forward half of the of the chassis 34.

The rear suspension arms 50 are also pivotally attached, again as their name implies, towards the rear portion of the internal frame 14. Unlike the front suspension arms 48, the pivotal attachment of the rear suspension arms 50 to the slide rails 52 employs a pair of rear attachment links 54. The rear attachment links 54 are pivotally attached at their upper ends to the lower ends of the rear suspension arms 50 and at their lower ends to the slide rails 52. Conversely, the attachment of the upper ends of the rear suspension arms 50 is accomplished by the use of a simple pivotal attachment. The use of the rear attachment links 54 serves to isolate the slide rails 52 from the chassis 34 in this area because motion of the slide rails 52 is taken up by the rear attachment links 54.

The operational aspect of these track drive systems 11 is detailed in FIG. 4 which illustrates a typical circumstance in which the configuration of the internal frame 14 has been altered due to rotational power being applied to the track 36. The application of power to the track 36 causes track rotation as indicated by arrow 56. The track rotation places horizontal tractive forces on the internal frame 14 which are manifested in the relationship between the chassis 34 and the slide rails 52. As this FIGURE illustrates, the horizontal tractive forces cause the slide rails 52 to pivot around the slide rail pivot points 80 which will be discussed in greater detail below. This pivotal motion tends to lessen the distance between the chassis 34 and the slide rails 52 at their rearward end which in turn tends to lift the rear of the track 36 off of the surface of the snow 72. With the track 36 lifted in this manner, the track contact surface 82 is lessened to a great degree which in turn results in an unequal weight distribution through the track contact surface 82. The unequal weight distribution is the characteristic of the conventional track drive system 11 that causes the problems described above and is the flaw to which the present invention is directed.

The forces that cause this problem in the prior art are further illustrated in FIG. 9. The rotation of the track 36 creates two separate and opposite forces on the internal frame 14. The first of these is the track tension indicated by arrow 75 which places forces on the internal frame in the direction of track 36 rotation. The second is a ground reaction force indicated by arrow 76 and is generated by the interaction of the rotating track 36 and the surface over which it is traveling. The result of two oppositely acting forces is to create a force vector indicated by vector line 77 bisecting the internal frame 14 of the prior art.

The problem encountered in the prior art is a result of this vector line 77 and its position relative to position of the chassis pivot point 78, or the point at which forces generated in the slide rails 52 are transferred to the chassis 34 through the slide rail pivot point 80 and the front suspension arm 48. The vector line 77 passes above the chassis pivot point 78 resulting in an unbalanced situation. Consequently, the unbalanced forces tend towards equilibrium by forcing the vector line 77 towards the chassis pivot point 78 thereby pulling the rear of the track 36 in an upward manner and resulting in the problem of unequal weight distribution at the track 36 which addressed by the present invention. Incidentally, the down forces created by the weight of the vehicle and indicated by arrow 74 are also transferred through these components from the chassis 36 to the slide rails 52.

Figure 5:
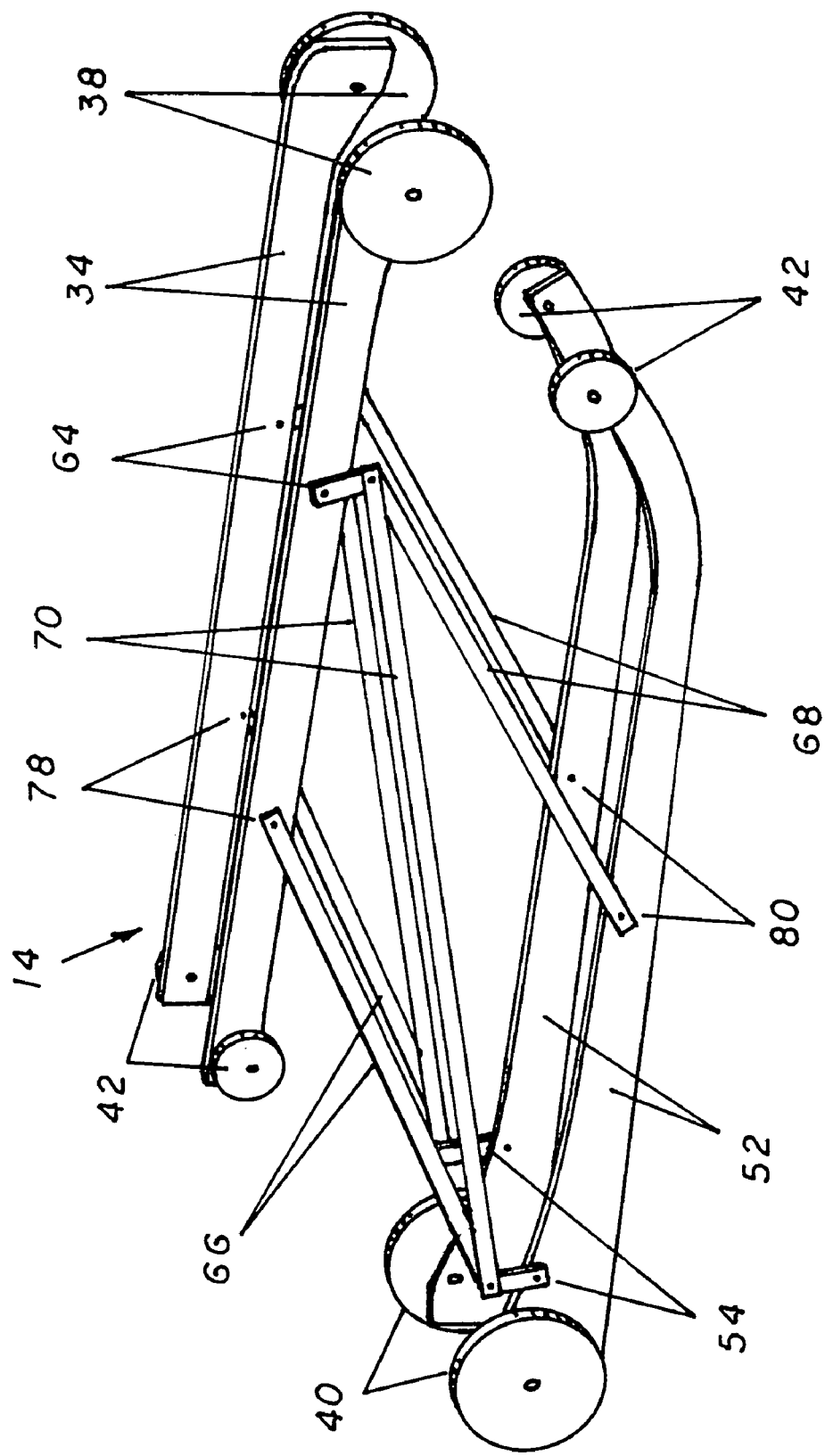
FIG. 5 is a perspective view of the internal frame component of the present invention illustrating the orientation of the chassis and slide rails and the manner by which they are tied together.
Figure 7:
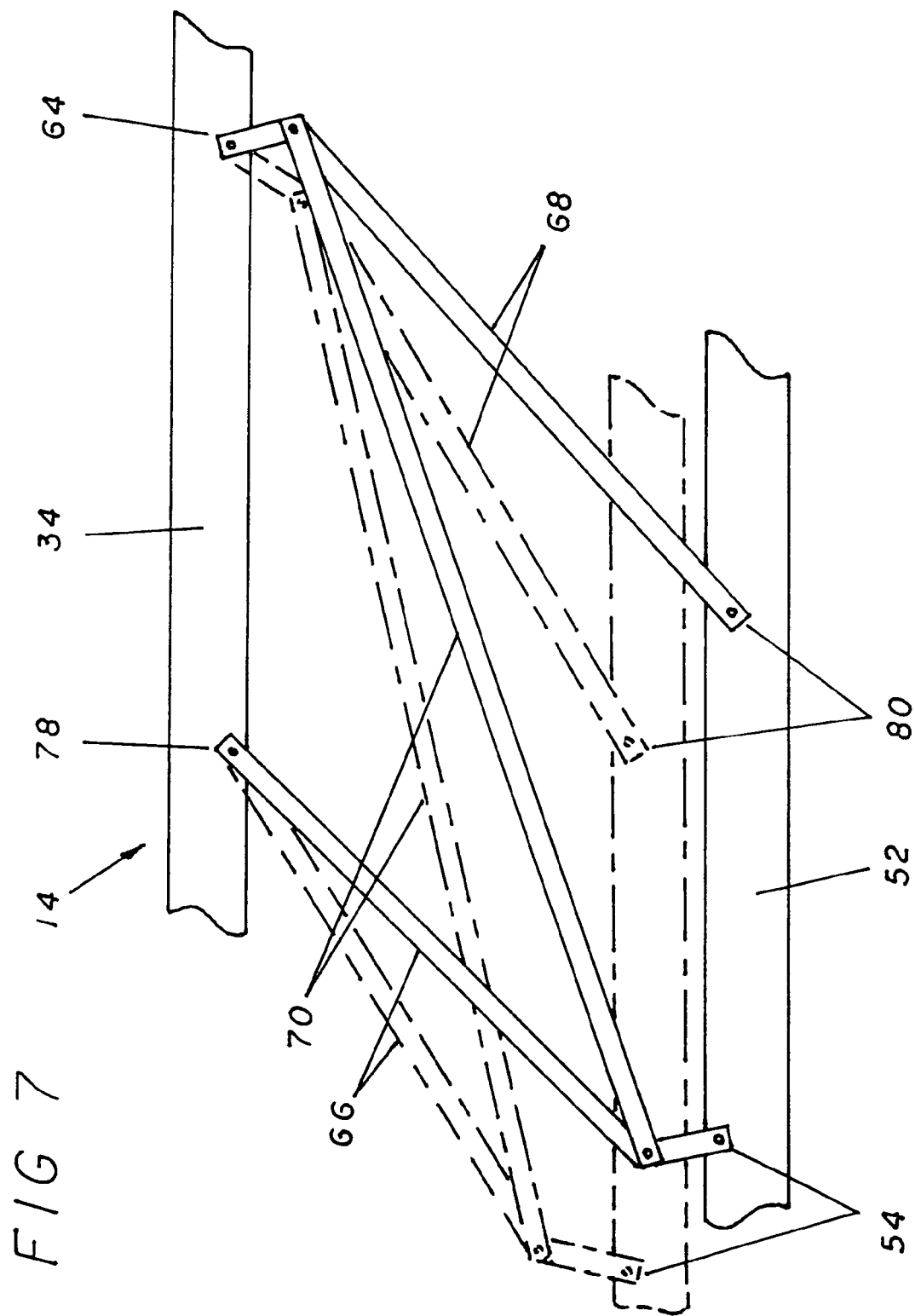
FIG. 7 is a side elevation closeup view of the chassis and slide rail components of the present invention illustrating the manner by which horizontal tractive forces in the slide rails are transferred to the chassis.
Figure 8:
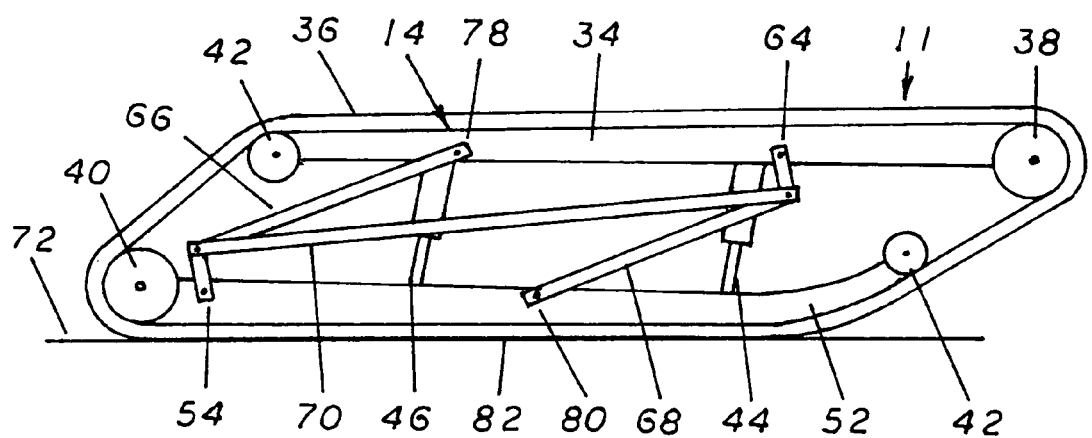
FIG. 8 is a side elevation view of the present invention illustrating its general configuration and the orientation of its major components.

The manner of construction of the internal frame 14 component of the present invention is further illustrated in FIGS. 5, 7, and 8 which detail the use of the components which alter the manner in which the internal frame 14 functions under power. As with the prior art, the chassis 34 serves as the pivotal point of attachment for the slide rails 52 in the present invention but its overall design and construction also incorporates a number of improvements and variations which will be described below.

The central portion of the slide rails 52 is equipped with a pair of slide rail pivot points 80 to which are pivotally attached the lower ends of a pair of front undercarriage arms 68. The front undercarriage arms 68 extend diagonally upwards from these points of pivotal attachment to a point at which their upper ends are in turn pivotally attached to the lower end of a pair of front attachment links 64. The upper end of the front attachment links 64 is in turn pivotally attached to the chassis 34. The operation of the front attachment links 64 is to isolate the slide rails 52 through their attachments to the front undercarriage arms 68. Thus, horizontal tractive forces present in the slide rails 52 cannot be transferred to the chassis 34 through the front undercarriage arms 68.

The rear portion of the slide rails 52 is also pivotally attached to the chassis 34 through a similar group of components. The pivotal attachment at the slide rails 52 is made at the lower ends of a pair of rear attachment links 54 which extend upwards therefrom. The upper ends of these rear attachment links 54 are in turn pivotally attached to the lower ends of a pair of rear undercarriage arms 66 which extend diagonally upwards therefrom. The upper ends of these rear undercarriage arms 66 are in turn pivotally connected to the chassis 34 at the chassis pivot point 78. This method of pivotally connecting the slide rails 52 to the chassis 34 also serves to isolate the slide rails 52 inhibiting the transfer of horizontal tractive forces to the chassis 34 through this connection.

The final component of the present invention, the drag links 70, serve to tie the front undercarriage arms 68 to the rear undercarriage arms 66 at each of their pivotal points of attachment to the rear attachment links 54 and the front attachment links 64 respectively. The drag links 70 operate to transfer the horizontal tractive forces from the slide rail pivot points 80, through the front undercarriage arms 68 and the rear undercarriage arms 66 to the chassis pivot points 78 located on the rearward portion of the chassis 34. The described method of pivotal attachment of the slide rails 52 to the chassis 34 allows the position of the slide rails 52 to vary upon need in relation to the chassis as detailed in FIG. 7.

Figure 6:
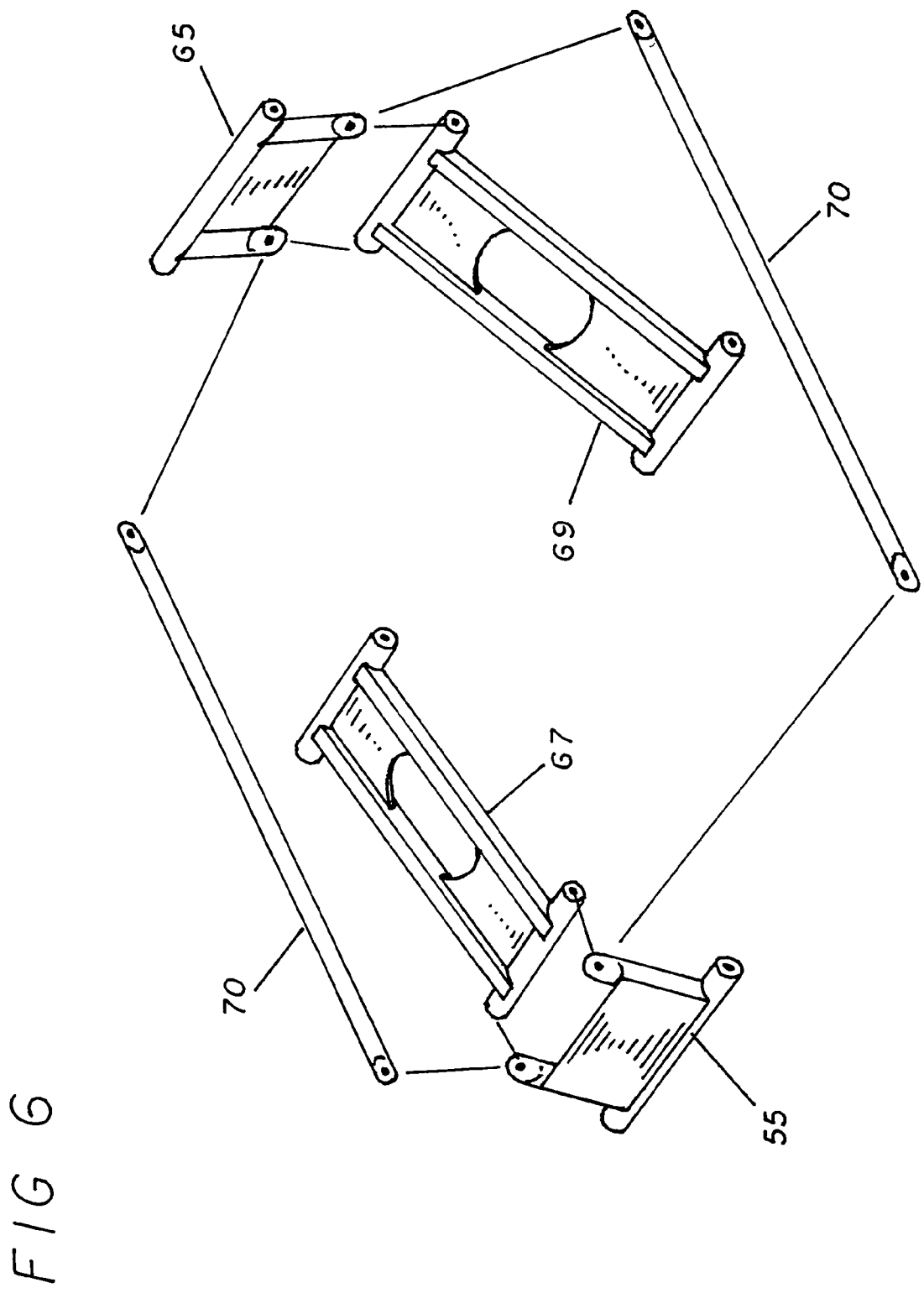
FIG. 6 is an exploded perspective view of the undercarriage arm and drag link components of the present invention illustrating the manner in which they are assembled to perform the necessary functions.

An additional method of constructing these components of the internal frame 14 is illustrated in FIG. 6. In this method of construction, the pivotal connection of the slide rails 52 at the rear end to the chassis 34 is made trough the rear internal link 55 which is single unit spanning the space between the slide rails 52 and replaces the rear links 54. The rear internal link 55 is then pivotally attached at its upper end to the lower end of the rear internal undercarriage arm 67 which again is a single unit replacing the rear undercarriage arms 66. The rear internal undercarriage arm 67 is then pivotally attached at its upper end to the chassis at the chassis pivot point 78.

The pivotal connection of the slide rails at their forward ends to the chassis 34 is made through the pivotal attachment of the lower ends of the front internal undercarriage arm 69 at the slide rail pivot point 80. The front internal undercarriage arm 69 is a single unit replacing the front undercarriage arms 66 previously described. The upper end of the front internal undercarriage arm 69 is then pivotally attached to the lower end of the front internal link 65 which is a single unit pivotally attached to the chassis 24. The front internal link 65 replaces the front attachment links 64 described above. In all other aspects, the components described here function exactly the same as those described above.

The manner by which the present invention corrects the unequal distribution of the forces created by the rotating track 36 in the prior art is illustrated in FIGS. 8 and 10. The isolation of the rear undercarriage arm 66 from the slide rails 52, the isolation of the front undercarriage arm 68 from the chassis 34, and the use of the drag link 70 to tie them together all operate to alter the position of the chassis pivot point 78 so that it exists at the pivotal attachment of the rear undercarriage arm 66. The importance of this is a result of the position of the vector line 77 representing the forces developed from the track tension 75 and ground reaction force 76. With the chassis pivot point 78 moved rearward to the correct position, the vector line 77 substantially intersects undercarriage arm 66. The result of this is that no unequal forces are created by these action and therefore, the internal frame 14 and track 36 remain in a stable configuration eliminating the associated problems in the prior art.

While the application of rotational force to the track 36 in the prior art tends to alter the parallel relationship of its chassis 34 and slide rails 52, the construction of the internal frame 14 of the present invention stops this from happening. The important aspect of this is that this has no effect on the size or shape of the track contact surface 82. Additionally, the placement of the front and rear shock absorbers, 44 and 46, within the internal frame 14 is accomplished so that the forces applied by them are centered as much as possible over the track contact surface 82. These features of the present invention ensure that the weight of the vehicle will be transferred to the surface of the snow equally over the entire surface of the track contact surface 82 which is illustrated by the arrows labeled 76 in this FIGURE. The equal distribution of weight over the relatively large surface area of the track contact surface 82 ensures that the present invention will not unnecessarily sink into the snow thereby allowing the track 36 to float on the top of the snow surface 72.

Additionally, these same characteristics of the present invention also provide the vehicle with the maximum possible amount of traction under all driving conditions including times of hard acceleration. This is accomplished by ensuring that the greatest amount of the track 36 is in contact with the surface 72 resulting in the largest possible amount of traction between the two. Therefore, the present invention imparts the best possible performance to the vehicle that is employing it as its track drive system.

Although the present invention has been described in considerable detail with reference to certain preferred versions thereof, other versions are possible. Therefore, the spirit and scope of the appended claims should not be limited to the description of the preferred versions contained herein.

What is claimed:

1. A suspension system for an endless track drive having an upper frame system with a front, center and rear section and a lower slide rail system also having a front, center and rear section, said suspension system comprising:

an elongate rear arm having a top end and a bottom end with said top end being pivotally connected to said upper frame system in said rear section;

a rear attachment link having a first and second rear attachment link pivot point with said first rear attachment link pivot point being pivotally attached to a rear section of said lower slide rail and said second rear attachment link pivot point being pivotally attached to said bottom end of said elongate rear arm;

an elongate front arm having a top end and a bottom end with said bottom end being pivotally connected to said slide rail system forward of said rear attachment link;

a front attachment link having a first and second front attachment link pivot point with said first front attachment link pivot point being pivotally attached to said upper frame system forward of said elongate rear arm top end and said second front attachment link pivot point being pivotally connected to said top end of said elongate front arm; and a means of fixing the distance between said second rear attachment link pivot point and said second front attachment link pivot point relative to each other.

2. A suspension system as in claim 1 wherein said rear attachment link comprises a left and a right rear attachment link.

3. A suspension system as in claim 2 wherein said front attachment link comprises a left and a right front attachment link.

4. A suspension system as in claim 3 wherein said means of fixing the distance between said second rear attachment link pivot point and said second front attachment link pivot point is an elongate rigid drag link.

5. A suspension system as in claim 4 wherein said elongate front arm bottom end is pivotally connected to said slide rail in said slide rails center section.

6. A suspension system as in claim 5 wherein said front attachment links first front attachment link pivot point is pivotally attached to said upper frame system in the front section of said upper frame.

7. A suspension system for an endless track drive having an upper frame system with a front, center and rear section and a lower slide rail system also having a front, center and rear section, said suspension system comprising:

an elongate rear arm having a top end and a bottom end with said top end being pivotally connected to said upper frame system in said rear section;

a rear attachment means for attaching said slide rail to said bottom end of said elongate rear arm and substantially isolating said elongate rear arm from a forces generated by said slide rail;

an elongate front arm having a top end and a bottom end with said bottom end being pivotally connected to said slide rail system forward of said rear attachment means;

a front attachment means for attaching said upper frame system to said top end of said elongate front arm so as to substantially isolate said upper frame system from a forces transferred by said elongate front arm; and a means of fixing a distance between said bottom end of said elongate rear arm and said top end of said elongate front arm.

8. A suspension system as in claim 7 wherein said means of fixing the distance between said bottom end of said elongate rear arm and said top end of said elongate front arm is an elongate rigid drag link.

9. A suspension system as in claim 8 wherein said rear attachment means is a rear attachment link having a first and second rear attachment link pivot point with said first rear attachment link pivot point being pivotally attached to the rear section of said lower slide rail and said second rear attachment link pivot point being pivotally attached to said bottom end of said elongate rear arm.

10. A suspension system as in claim 9 wherein said rear attachment link comprises a left and a right rear attachment link.

11. A suspension system as in claim 10 where in said front attachment means is a front attachment link having a first and second front attachment link pivot point with said first front attachment link pivot point being pivotally attached to said upper frame system forward of said elongate rear arm top end and said second front attachment link pivot point being pivotally connected to said top end of said elongate front arm.

12. A suspension system as in claim 11 wherein said front attachment link comprises a left and a right front attachment link.

13. A suspension system as in claim 12 wherein said elongate front arm bottom end is pivotally connected to said slide rail in said slide rail's center section.

14. A suspension system as in claim 13 wherein said front attachment links first front attachment link pivot point is pivotally attached to said upper frame system in the front section of said upper frame.

15. A suspension system for an endless track drive said suspension system comprising:
   an upper frame system with a front, center and rear section;
   a lower slide rail system also having a front, center and rear section;
   an elongate rear arm having a top end and a bottom end with said top end being pivotally connected to said upper frame system in said rear section;
   a rear attachment link having a first and second rear attachment link pivot point with said first rear attachment link pivot point being pivotally attached to the rear section of said lower slide rail and said second rear attachment link pivot point being pivotally attached to said bottom end of said elongate rear arm;
   an elongate front arm having a top end and a bottom end with said bottom end being pivotally connected to said slide rail system forward of said rear attachment link;
   a front attachment link having a first and second front attachment link pivot point with said first front attachment link pivot point being pivotally attached to said upper frame system forward of said elongate rear arm top end and said second front attachment link pivot point being pivotally connected to said top end of said elongate front arm; and
   a rigid drag pivotally connecting said second rear attachment link pivot point and said second front attachment link pivot point.

16. A suspension system as in claim 15 wherein said rear attachment link comprises a left and a right rear attachment link.

17. A suspension system as in claim 16 wherein said front attachment link comprises a left and a right front attachment link.

18. A suspension system as in claim 17 wherein said elongate front arm bottom end is pivotally connected to said slide rail in said slide rail's center section.

19. A suspension system as in claim 18 wherein said front attachment links first front attachment link pivot point is pivotally attached to said upper frame system in the front section of said upper frame.

* * * * *